Sept. 5, 1967  R. W. G. SOMERVELL ET AL  3,339,858
DRIVE REVERSING MECHANISM

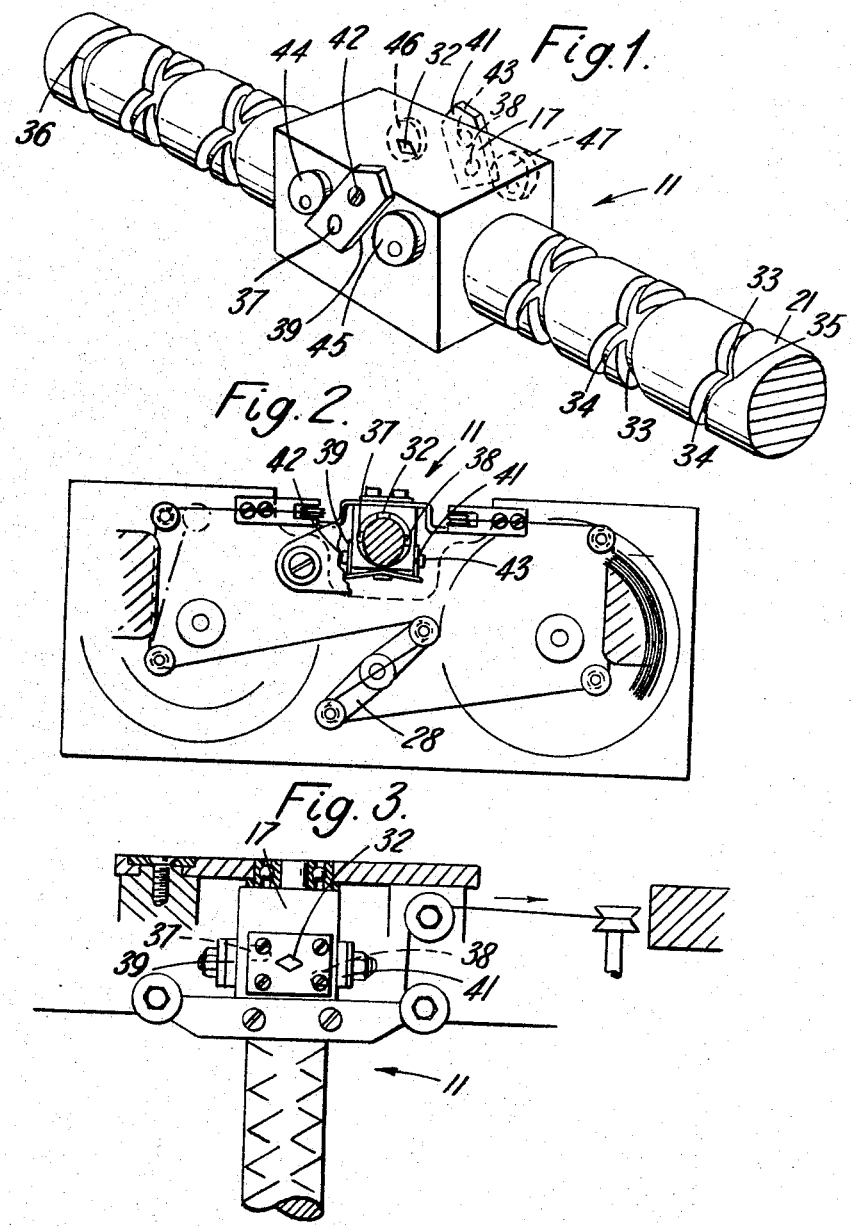

Filed June 3, 1965  4 Sheets-Sheet 3

United States Patent Office 3,339,858
Patented Sept. 5, 1967

3,339,858
DRIVE REVERSING MECHANISM
Roland William Gordon Somervell, Beaconsfield, England, assignor to S. Davall & Sons Limited, Greenford, Middlesex, England, a British company
Filed June 3, 1965, Ser. No. 461,139
Claims priority, application Great Britain, June 4, 1964, 23,262/64
10 Claims. (Cl. 242—54.1)

ABSTRACT OF THE DISCLOSURE

A reciprocating carriage for a guide for layering wire in a magnetic wire recording mechanism slides on a rotatable shaft cut with opposite handed helical grooves. A peg on the carriage engages in the grooves and can change over from following one groove to following the other at groove intersections to reverse the carriage substantially without dwell. The peg is constrained to follow one or other groove without changeover between desired limits of travel by an auxiliary follower peg adjustable between two conditions. Changeover of the auxiliary peg from one condition to its other permits or causes reversal of the carriage. Cross reference is made in the specification to the following copending U. S. patent applications:
Serial Nos. 461,137 and 461,138, filed June 3, 1965, and 478,073, filed Aug. 9, 1965.

---

Figures 4, 5:
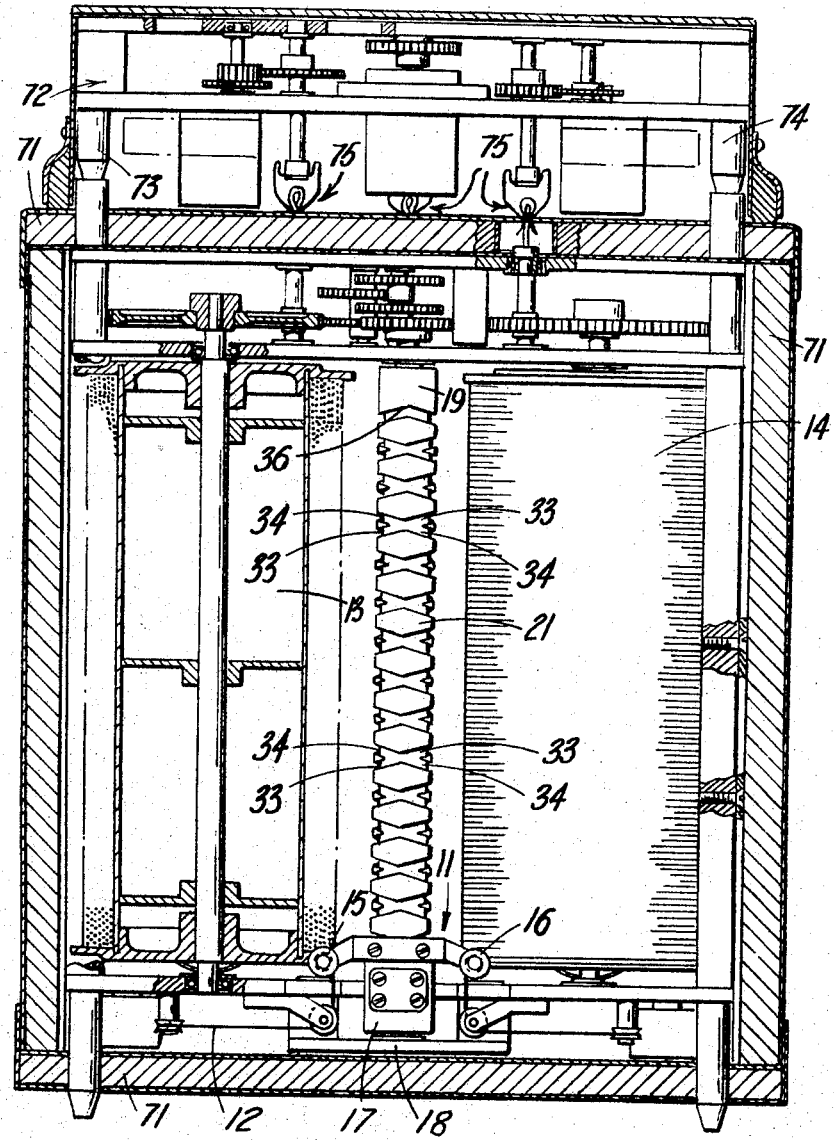

The invention relates to drive reversing mechanisms.

The invention provides a drive reversing mechanism comprising two intersecting helical guideway tracks, a track-follower shaped so as to be capable of following either of the tracks to be driven therealong and of changing from following one track to following the other track at at least one intersection of the tracks thereby to produce a substantially instantaneous reversal of drive by a sharp change in track following direction, auxiliary track-following means adjustable between two alternative conditions in which it causes the track follower to follow one or the other of the tracks respectively, and means for causing the auxiliary track following means to change from one of its said conditions to the other at at least one limit of travel of the track follower.

Preferably the two helical guideway tracks are formed on a shaft which is rotatable relative to the track follower, the helical guideway tracks being respectively of opposite sense so that for rotation of the shaft in one sense the track follower and the shaft move relatively in one direction of the axis of the shaft when the track follower is caused to follow one of the tracks, and in the opposite direction when the track follower is caused to follow the other of the tracks.

Preferably the two helical guideway tracks comprise respectively left and right handed helical grooves cut in the shaft.

Preferably the track follower comprises a projection for engaging in the grooves.

Preferably the track follower is mounted on a carriage adapted to be slidably received on the shaft.

Preferably the auxiliary track following means comprise at least one member mounted on the carriage and movable between two alternative positions, means for resiliently resisting movement of the member away from each of the said two positions, in one of which positions the member is adapted to engage in one of the grooves in such a manner as to cause the track follower to follow the said one groove, and in the other of which positions the member is adapted to engage the other of the grooves in such a manner as to cause the track follower to follow the said other groove.

The invention includes the aforesaid drive reversing mechanism incorporated in a magnetic recording mechanism comprising two reels on which is wound an extended magnetisable member, which is fed through the recording mechanism off one reel and onto the other, there being provided a guide through which the member is fed, the guide being coupled to the drive reversing mechanism, whereby the guide is reciprocated to cause the extended member to form into, and run easily from, even axially extending layers on the reel.

Preferably the extended magnetisable member comprises magnetisable wire.

Figure 6:
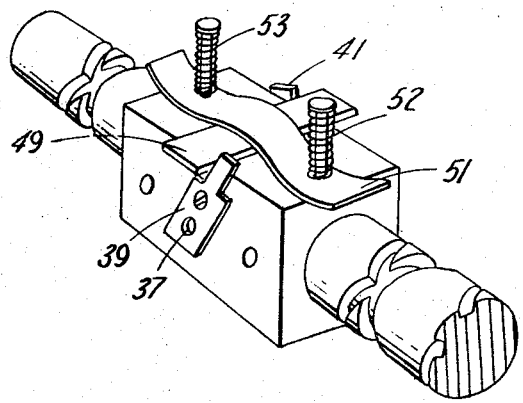
Figure 7:
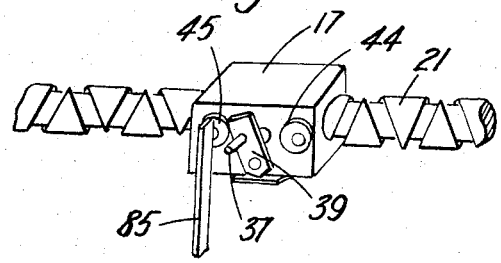
Figure 9:
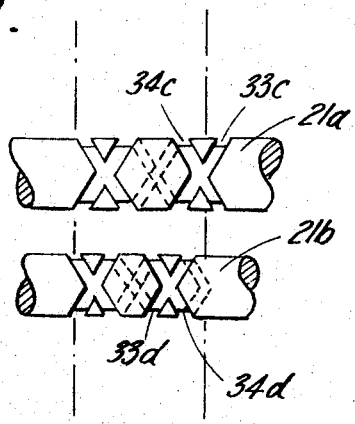
Figure 8:
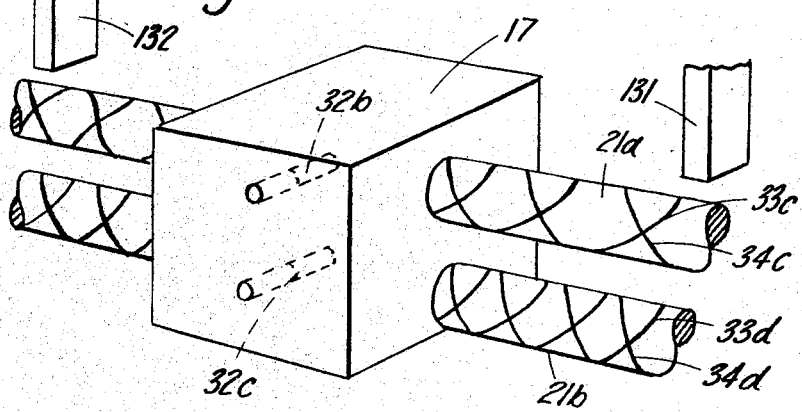
Figure 10:
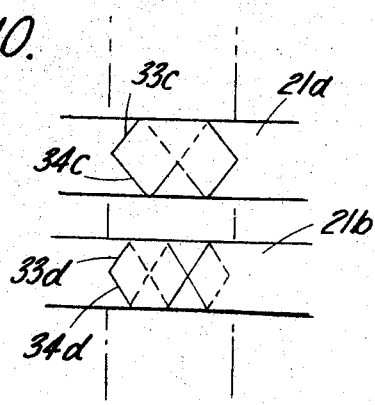

Specific constructions of drive reversing mechanism embodying the invention will now be described by way of example and with reference to the accompanying drawings in which:

FIGURE 1 is a diagrammatic perspective view of the mechanism,

FIGURE 2 is a diagrammatic sectional view showing the drive reversing mechanism incorporated in a magnetic wire recording mechanism, FIGURE 3 is a diagrammatic view from above of the drive reversing mechanism, FIGURE 4 is a plan view partly in section of the wire recording mechanism incorporating the drive reversing mechanism, FIGURE 5 is an end view of the wire recording mechanism shown in FIGURE 4, FIGURE 6 is a diagrammatic perspective view of an alternative drive reversing mechanism, FIGURE 7 is a perspective view of part of another drive reversing mechanism, FIGURE 8 is a diagrammatic perspective view of another drive reversing mechanism, FIGURE 9 is a detail view which shows, cut away, a part of the mechanism shown in FIGURE 8, and FIGURE 10 is a diagrammatic illustration of the part shown in FIGURE 9, In the example shown in FIGURES 1 to 6 the reversing mechanism 11 is incorporated in a magnetic wire recording mechanism, also referred to in copending patent applications Nos. 461,137 and 461,138 filed June 3, 1965, and 478,073, filed Aug. 9, 1965. in which recording wire 12 is wound from one cylindrical drum 13 onto another cylindrical drum 14 (see FIGURE 4).

The wire 12 is guided by pulleys 15, 16 mounted on a carriage 17 which travels between the ends 18, 19 of a shaft 21, and by further fixed pulleys 22, 23, 24, 25, 26, 27 and a jockey pulley system 28. The fixed pulleys guide the wire past a recording and play-back head 29 and an erase head 31. The pulleys 15, 16 on the carriage 17 guide the wire onto the cylindrical drums 13, 14 in even rows. The jockey pulley system 28 forms part of an apparatus for controlling the tension on the wire.

The carriage 17 is mounted on the shaft 21 and a follower peg 32 fixed in the carriage 17, projects into grooves 33, 34 cut in the shaft 21. The grooves 33, 34 respectively form right and left handed screw threads in the shaft 21 so that if the shaft is rotated the carriage 17, which is restrained from rotating with the shaft 21, is driven in one axial direction of the shaft when the peg 32 engages with one groove and in the opposite direction when the peg 32 engages with the other groove.

In this example, at each end of the shaft 21 one groove leads sharply into the other as shown at 35 and 36 (see FIGURES 1 and 4). Thus, when the carriage 17 has been driven to the end 18, the peg 32, travelling in say groove 33, is passed by the corner at 35 and is caused to move sharply into the groove 34 which drives the carriage towards the other end 19 of the shaft 21.

In order to avoid, or reduce, the possibility of the peg 32 moving from one groove into the other at points where the grooves 33, 34 intersect intermediate the ends 18, 19 of the shaft 21, two further guide pegs 37, 38 (see FIGURE 2) are provided as auxiliary track followers.

The guide pegs 37, 38 are fixed to pivoted arms 39, 41 so that the guide pegs 37, 38 project into the groove 33 or 34 at points respectively leading and lagging the peg 32 by 90 degrees, i.e. ¼ of the pitch of the groove.

The arms 39, 41 are movable about their pivots 42, 43 between stops 44, 45 and 46, 47. A leaf spring 48 (not shown in FIGURE 1, see FIGURE 5) pressing on points 49, 51 on the arms 39, 41 biasses the arms against one or other of their respective stops with a toggle action.

When the peg 32 is travelling in the groove 33 the guide peg 37 is against its stop 45 and thus firmly resists in one direction movement of the peg 32 out of the groove 33. The guide peg 38 is against its stop 46 and thus firmly resists in the other direction movement of the peg 32 out of the groove 33. In this way the guide pegs 37, 38 guide the peg 32 past the points of intersection of the grooves 33, 34 intermediate the ends 18, 19.

As the carriage 17 reaches an end of the shaft 21 the leading guide peg is diverted by the corner 35 (or 36) and the arm to which the peg is attached moves over, with a toggle action imparted by the leaf spring 48, from its position in abutment with one stop to its position in abutment with its other stop. Thus the leading guide peg is ready to guide the carriage down the other track of the shaft 21. The follower peg 32 then reaches the corner 35 and the movement of the carriage is reversed. The lagging guide peg is then forced by the corner into its other position and the three pegs are duly positioned for the return travel of the carriage 17 down the shaft 21. The sequence is repeated at the other end of the shaft 21 so that the carriage reciprocates between the ends of the shaft. The direction of travel is automatically reversed without necessitating any change of orientation of the track follower relative to the tracks.

In this example the reciprocating carriage 17 guides the recording wire 12 from the drums 13, 14 as they are wound so as to lay the wire evenly. The reversal at each end of the travel is substantially instantaneous and, for example, 70 miles of wire can be wound onto the drums without an unacceptable build up at each end of the drums.

In this example the drums 13, 14 are mounted together with the reversing mechanism 11 as a unit in a cassette having fire proof walls 71.

The unit is clamped, by means of a toggle clamp (not shown), to a motor drive unit 72. The two units are located relative to one another by dowels 73, 74 so that the couplings 75, described in copending patent application No. 461,137, filed June 3, 1965, are engaged and drive can be transmitted to the drums 13, 14.

In this example pads on the ends 76, 77 (see FIGURE 5) of a sprung strip are urged into contact with the drums 13, 14 and act as brakes which reduce the possibility of the drums unwinding when the cassette is not clamped onto the drive unit. An alternative braking mechanism may be provided which has a more positive action but which is released when the drive unit and cassette are clamped together.

In the mechanism shown diagrammatically in FIGURE 6 the arms 39, 41 are locked against a stop by a spring strip 49 which is pressed down by a curved strip 51 urged by springs 52, 53. At each end of the travel an abutment (not shown) is arranged to lift the curved strip 51 to release the locked arms to permit them to turn over.

Parts of the mechanism of the example shown in FIGURE 7 which correspond to parts of the mechanism of the examples shown in FIGURES 1 to 6 have been designated with the same reference numerals as the parts to which they correspond.

In this example shown in FIGURE 7 a sprung abutment member 85 is provided to cause the carriage 17 to reverse at any selected point along the shaft 21.

The guide pegs 37, 38 which are provided as auxiliary track followers, extend, in this example, from the pivoted arms 39, 41 in the direction away from the carriage 17.

The sprung abutment member 85 is positioned on one side of the shaft 21 so that, as the carriage 17 is moved towards the member 85, the extension of the leading auxiliary track follower peg moves into abutment with the member 85.

In the example shown in the FIGURE 7, the member 85 shown is for reversing the carriage from movement to the left to movement to the right.

After the leading peg 37 has moved into abutment with the member 85 the carriage 17 continues to move along the shaft 21 until the leading peg 37 reaches the next point where the two helical grooves 33, 34 cross. The member 85 is so positioned that when this point is reached the pressure on the peg 37 is sufficient to overcome the leaf spring 48 and cause the arm 39 carrying the peg to move over from abutment with the stop 45 into abutment with the stop 44. In this way the leading peg 39 is forced to change from following one groove to the other groove. This causes the follower peg 32 to change from following one groove to the other groove when it reaches the aforesaid point where the grooves 33, 34 cross. Thus the movement of the carriage 17 is reversed and as the carriage 17 moves off to the left the lagging auxiliary follower peg 38 is forced to change from following one groove to the other groove.

The reversal thus occurs at a point dependent on the position of the member 85. The position of the member 85 is adjustable so that the point of reversal along the shaft 21 can be adjusted.

An advantage of this example shown in FIGURE 7 is that no special end-shaping of the helical grooves is necessary; this can simplify machining of the grooves. A further advantage is that the sprung member 85 provides means which are independent of the shaft 21 for causing reversal of the carriage.

For one sense of rotation of the shaft 21 the peg 37 will always lead and thus a second sprung member (not shown), suitably positioned to the right (as seen in FIGURE 7) of the carriage 17 on the same side of the shaft 21 as the member 85 shown in FIGURE 7, would operate to reverse movement of the carriage from right to left.

Parts of the mechanism of the example shown in FIGURES 8 to 10 which correspond to parts of the mechanism of the examples shown in FIGURES 1 to 6 have been designated with the same reference numerals as the parts to which they correspond.

In the example shown in FIGURES 8 to 10, the carriage 17 runs over two shafts 21a, 21b. The carriage 17 has fixed in it pegs 32b and 32c. The peg 32b projects into grooves 33c, 34c cut in the shaft 21a. The peg 32c projects into grooves 33d, 34d, cut in the shaft 21b. As in the examples described above the two grooves in each of the shafts form respectively screw threads of opposite sense.

However, the pitch of the grooves 33d, 34d in the shaft 21b is different from the pitch of the grooves 33c, 34c in the shaft 21a. This is illustrated in FIGURES 15 and 16 which show the pitch of the grooves in the shaft 21b to be two thirds the pitch of the grooves in the shaft 21a.

By appropriately gearing the shafts 21a and 21b, they can be rotated so as to cause the carriage 17 to travel along the shafts. Owing to the difference in pitch of the grooves in the two shafts there is a distance more than that corresponding to half a turn of the shaft positions between where the peg 32b will move past a point where the grooves 33c, 34c cross at the same moment as the peg 32c moves past a point where the grooves 33d, 34d cross.

Thus, when the carriage is caused to travel over the shafts between those positions the peg 32b is prevented from reversing the carriage 17 at points where the grooves 33c and 34c cross by the drive from the peg 32c which will not be at a point where the grooves 33d and 34d cross. Similarly, reversal of the carriage 17 by the peg 32c is prevented by drive from the peg 32b.

Reversal of the carriage can thus only be effected at the positions defined above. Appropriately positioned buffer springs 131, 132 bias the carriage to reverse at those positions, which in this example, are at the limits of travel of the carriage 17.

The distance of the travel between those positions is determined by the ratio of pitches of the grooves in the shafts 21a and 21b respectively. The distance can therefore be selected by appropriate selection of the ratio of pitches of the grooves. It will be appreciated that the diagrammatic illustration in FIGURE 8 of the position of the buffer springs corresponds to shafts having grooves with a difference in pitch considerably smaller than that illustrated in FIGURES 9 and 10.

The invention is not restricted to the details of the foregoing examples. For instance the drive reversing mechanism need not necessarily be used with a magnetic wire recording mechanism but may, for example, be used for winding tape or ribbon onto drums, or fishing reels. The wire need not necessarily be guided directly by the carriage but may, for example, be guided by a pivoted lever arm attached to the carriage.

In the example shown in FIGURES 1 to 7 there need not necessarily be two guide pegs but there may for example be only one. In that case it may be necessary to arrange that the guide peg is locked in position whilst the carriage is travelling between the ends of the shaft and that the locking is released for the arm to turn over at each end of the travel.

I claim:

1. A drive reversing mechanism comprising a carriage, two helical guideway tracks having intersections one with the other, a track-follower on the carriage and engageable with either of the tracks, whereby relative rotation of the carriage and the tracks causes relative axial movement thereof, the track-follower being capable of switching from following one track to following the other track at at least one intersection of the track thereby to produce a substantially instantaneous reversal of the said relative axial movement, auxiliary track-following means on the carriage and having two alternative conditions, the auxiliary track-following means imparting positive drive to the carriage at least during transit by the track-follower of an intersection of the tracks, the direction of the said positive drive being reversed when the auxiliary track-following means is changed from one condition to its other condition, whereby the track-follower is caused to follow one track when the auxiliary track-following means is in one condition and the other track when the auxiliary track-following means is in the other condition, and changeover means operable to cause the auxiliary track-following means to change from one of its said conditions to the other at at least one limit of travel of the track-follower.

2. A drive reversing mechanism as claimed in claim 1, in which the two helical guideway tracks are formed on a shaft which is rotatable relative to the carriage, the helical guideway tracks being respectively of opposite sense.

3. A drive reversing mechanism as claimed in claim 2, in which the carriage is slidably received on the shaft.

4. A drive reversing mechanism, as claimed in claim 1, incorporated in a magnetic recording mechanism comprising two reels on which is wound an extended magnetisable member, which is fed through the recording mechanisms off one reel and onto the other, there being provided a guide through which the member is fed, the guide being coupled to the drive reversing mechanism whereby the guide is reciprocated to cause the extended member to form into, and run easily from, even axially extending layers on the reel.

5. A magnetic recording mechanism as claimed in claim 4, in which the extended magnetisable member comprises magnetisable wire.

6. A drive reversing mechanism comprising a rotatable shaft, two intersecting helical grooves cut in the shaft, one helical groove being right handed and the other left handed, a carriage slidably received on the shaft, a track-follower comprising a projection carried by the carriage and engageable in the grooves, whereby rotation of the shaft produces relative movement of the shaft and carriage along the axis of the shaft, the projection being capable of switching from following one groove to following the other groove at at least one intersection of the grooves thereby to produce a substantially instantaneous reversal of direction of relative axial movement of the shaft and carriage, auxiliary track-following means carried by the carriage and having two alternative conditions, in one of which conditions the auxiliary track-following means cause the said projection to follow one of the helical grooves whereby rotation of the shaft causes relative axial movement of shaft and carriage in one direction and in the other of which conditions the auxiliary track-following means cause the said projection to follow the other of the helical grooves whereby rotation of the shaft in the same sense as aforesaid causes relative axial movement of the shaft and carriage in the opposite direction, the auxiliary track-following means providing positive drive of the carriage relative to the shaft at least during transit by the said projection of an intersection of the grooves, and changeover means operable to cause the auxiliary track-following means to change from one of its said conditions to the other, whereby the projection is caused to switch, at an intersection of grooves, from following one groove to following the other groove, thereby to reverse the relative movement of shaft and carriage.

7. A drive reversing mechanism as claimed in claim 6, in which the auxiliary track-following means comprise at least one further projection engageable in the said helical grooves.

8. A drive reversing mechanism as claimed in claim 6, in which the auxiliary track-following means comprise at least one member mounted on the carriage and movable between two alternative positions corresponding respectively with the said two alternative conditions, toggle acting biassing means being coupled to the member to resist resiliently movement of the member away from each of the said two positions.

9. A drive reversing mechanism as claimed in claim 6, incorporated in a magnetic recording mechanism comprising two reels on which is wound an extended magnetisable member, which is fed through the recording mechanism off one reel and onto the other, there being provided a guide through which the member is fed, the guide being coupled to the drive reversing mechanism, whereby the guide is reciprocated to cause the extended member to form into, and run easily from, even axially extending layers on the reel.

10. A magnetic recording mechanism as claimed in claim 9, in which the extended magnetisable member comprises magnetisable wire.

References Cited

UNITED STATES PATENTS 2,409,942  10/1946  Knapp _____ 179—100.2
2,714,998  8/1955  Guilbert _____ 242—158.3

LEONARD D. CHRISTIAN, *Primary Examiner.*

UNITED STATES PATENT OFFICE
CERTIFICATE OF CORRECTION

Patent No. 3,339,858                         September 5, 1967

Roland William Gordon Somervell

It is certified that error appears in the above identified patent and that said Letters Patent are hereby corrected as shown below:

In the heading to the printed specification, lines 7 and 8, cancel "Claims priority, application Great Britain, June 4, 1964, 23,262/64".

Signed and sealed this 12th day of August 1969.

(SEAL)

Attest:

Edward M. Fletcher, Jr.

Attesting Officer

WILLIAM E. SCHUYLER, JR.

Commissioner of Patents